United States Patent [19]
Brown

[11] Patent Number: 5,165,645
[45] Date of Patent: Nov. 24, 1992

[54] EXTERIOR VEHICLE COOLER HOLDER

[76] Inventor: Tom Brown, 565 Dovewood Ct., Coalinga, Calif. 93210

[21] Appl. No.: 721,146

[22] Filed: Jun. 26, 1991

[51] Int. Cl.⁵ .......................................... A47B 96/00
[52] U.S. Cl. ................................ 248/310; 248/311.2
[58] Field of Search ...................... 248/310, 311.2, 500; 211/88; 182/129; 224/42.03 A, 42.07

[56] References Cited

U.S. PATENT DOCUMENTS

| | | | |
|---|---|---|---|
| 1,220,539 | 3/1917 | Pankratz | 248/310 X |
| 4,013,251 | 3/1977 | Cleveland | 248/310 X |
| 4,357,881 | 11/1982 | Delong | 211/88 X |
| 4,431,154 | 2/1984 | Hamm | 248/311.2 X |
| 4,824,060 | 4/1989 | Korda | 182/129 X |

Primary Examiner—Alvin C. Chin-Shue
Attorney, Agent, or Firm—Mark D. Miller

[57] ABSTRACT

A mounting device for holding a cooler in place on an external vertical surface of a vehicle or vessel, specially designed to accommodate coolers of the type which have a lid pivotally mounted on either side of a box at a (pushbotton) pivot. A pair of prongs on either side of the invention provide a pair of "U" shaped slots which slide between the box and the lid of the cooler, so that the pivots reach the bottoms of the two "U" shaped slots. An alternate embodiment provides a locking mechanism for holding the cooler in place once it has been slid onto the invention.

13 Claims, 3 Drawing Sheets

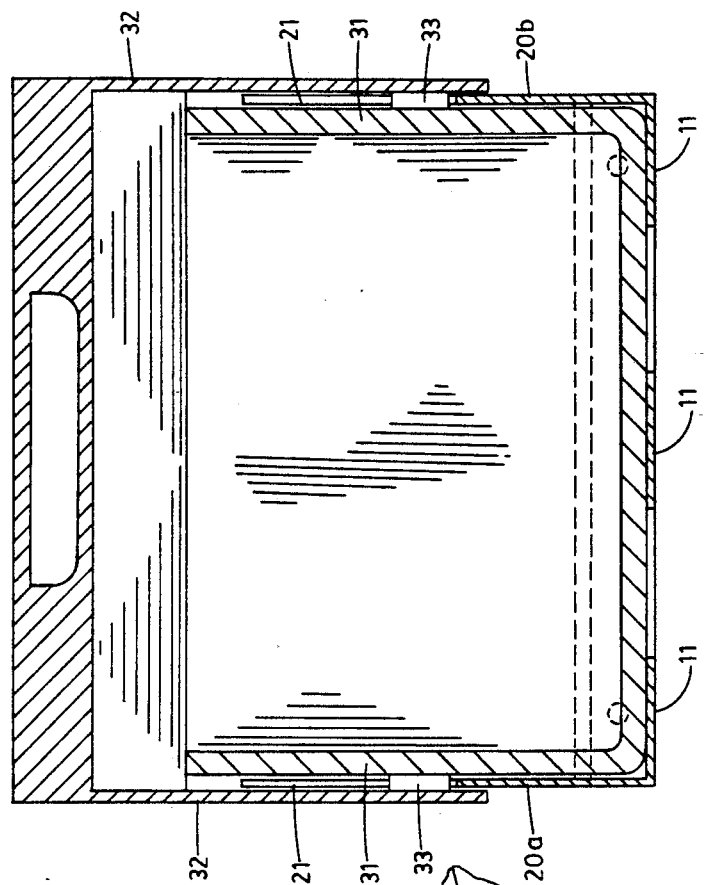
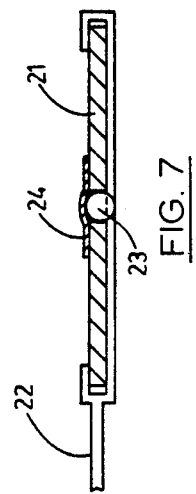
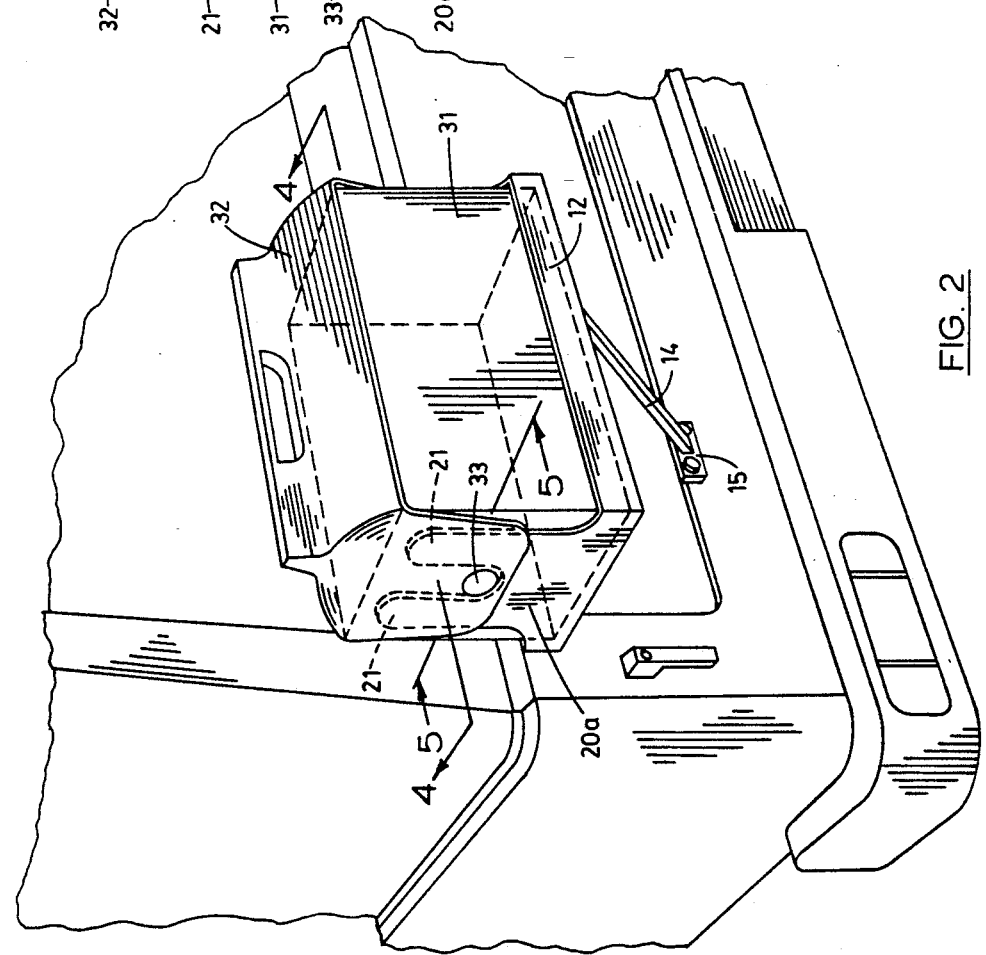

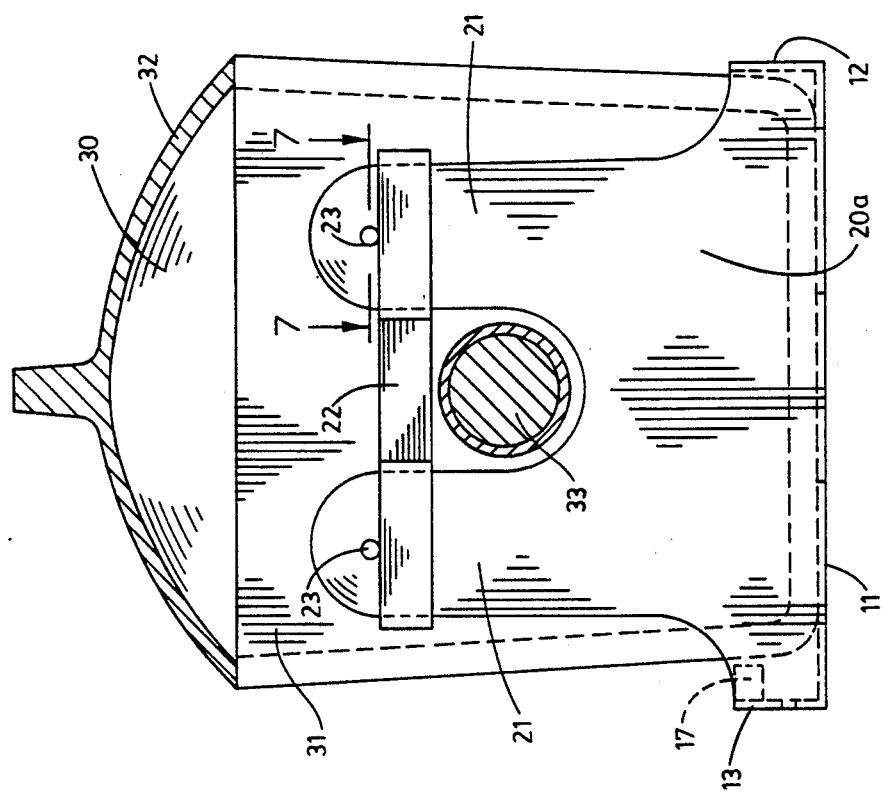
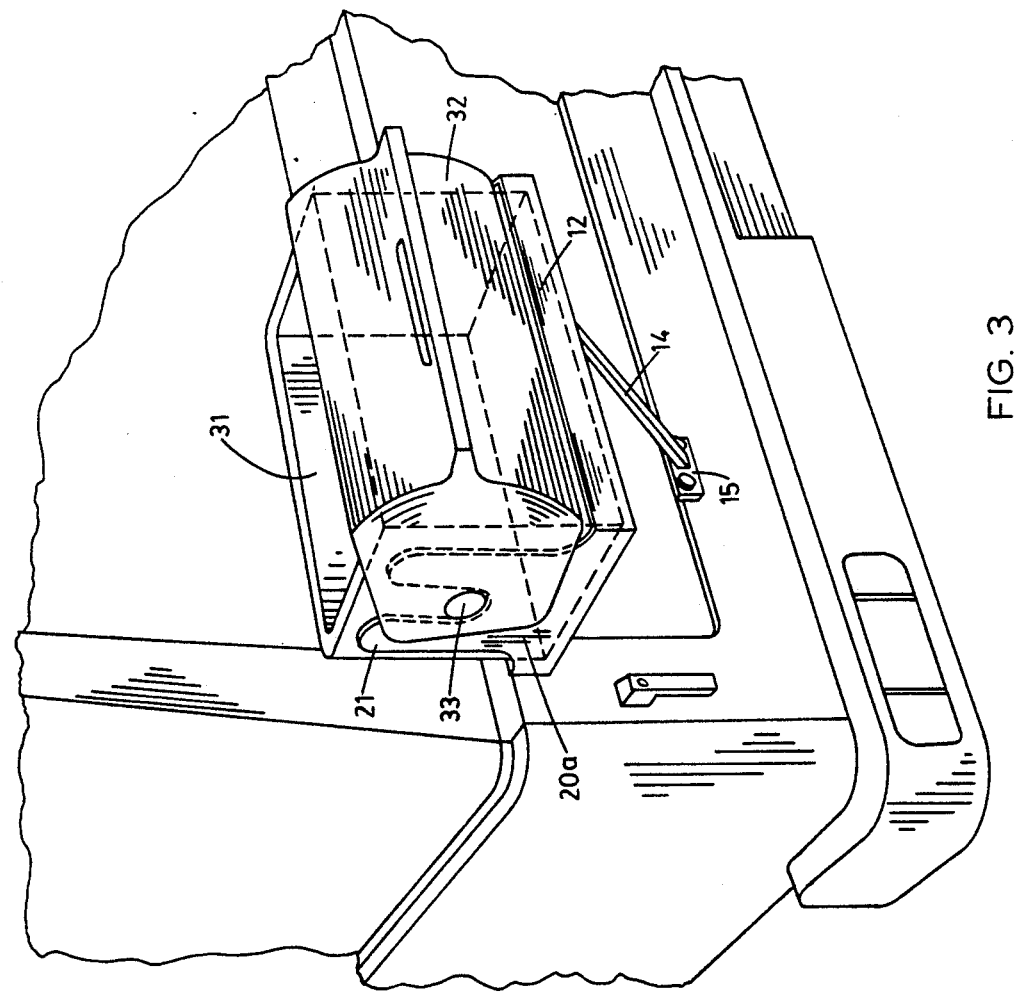

EXTERIOR VEHICLE COOLER HOLDER

BACKGROUND OF THE INVENTION

1. Field of the Invention

The present invention relates to cooler mounting assemblies, and more particularly to a new and improved assembly that may be mounted onto the exterior of a vehicle or vessel.

2. Description of the Prior Art

Numerous vehicle exterior mounting assemblies are known in the art. Many of these assemblies are directed to the holding of a fuel or water cans, including U.S. Pat. Nos. 3,104,860, 3,188,034, 4,132,336, 4,327,849, and 4,911,343. Each of these patents utilizes a series of brackets, springs and clamps to hold a standard shaped fuel/water can to the exterior of a vehicle.

Other patents describe exterior mounting assemblies directed toward holding such things as milk cans, No. 1,018,696; luggage, Nos. 1,356,328 1,621,176, and 1,740,368; water bags, No. 2,447,771; and a fisherman's basket, No. 4,936,480.

Several patents relate to cooler holders. U.S. Pat. No. 4,398,488 describes a removable canoe-carried cooler. This particular patent is directed the design of a cooler so that it fits conveniently into a canoe. No particular exterior mounting mechanism is disclosed. U.S. Pat. No. 4,889,267 describes a cooler caddie for a golf cart, which comprises a tray that holds both golf bag and cooler. U.S. Pat. No. 4,936,241 describes a cooler assembly for catamarans utilizing a tray and a series of straps and clips to hold the cooler in place on a pontoon. This particular patent is designed to hold coolers of a type having a pivotally mounted lid and a handle at the top. A strap is slided through the handle, and attached to the base with a special "U" shaped clip. However, this prevents the cooler from being opened while mounted, thus reducing stability while opened.

SUMMARY OF THE INVENTION

Coolers are widely utilized for pleasurable purposes in camping, fishing, picnicking, and many other outdoor activities. They are similarly used in commercial contexts by construction workers, road crews and the like. Coolers typically take up valuable space inside a vehicle or vessel, and are also prone to tip over and spill their contents. Another typical problem with coolers is gaining access to them or their contents once a destination is reached.

It is therefore a primary object of the present invention to provide a simple, easily accessible holder adapted for mounting on the exterior of a vehicle or vessel, upon which a cooler may be securely fastened and transported without taking up space inside vehicle. It is a further important object of the present invention to provide a secure place where a cooler may be stored to prevent tipping over and spillage of its contents during transport.

It is a further object of the present invention to provide a place to store a cooler, once the destination has been reached, where its contents will be readily accessible.

It is a further object of the present invention to provide a cooler holder adapted for mounting on the exterior of a vehicle or vessel which may be easily manufactured and is of durable construction.

BRIEF DESCRIPTION OF THE DRAWINGS

FIG. 2 is a perspective view of the present invention mounted in place at the rear of a vehicle showing a cooler installed. The lid of the cooler is closed.

FIG. 3 is a perspective view of the present invention mounted in place at the rear of a vehicle showing an cooler installed. The lid of the cooler is open.

FIG. 4 is a side cutaway view of the invention with a cooler installed along line 4—4 of FIG. 2.

FIG. 6 is an end view of an alternative embodiment of the present invention having a locking mechanism to hold a cooler in place.

FIG. 7 is a cutaway view of the invention along lines 7—7 of FIG. 6 showing detail of the locking mechanism.

DETAILED DESCRIPTION OF THE DRAWINGS

Figure 5:
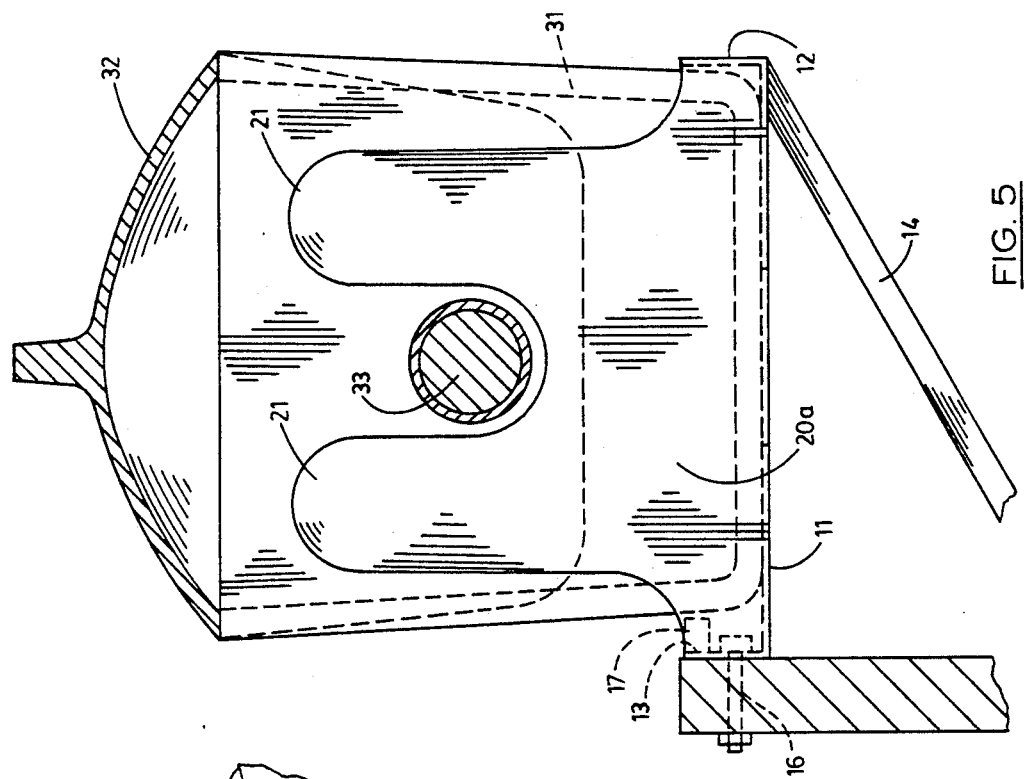
FIG. 5 is an end view of the present invention with a cooler installed along line 5—5 of FIG. 2.
Figure 1:
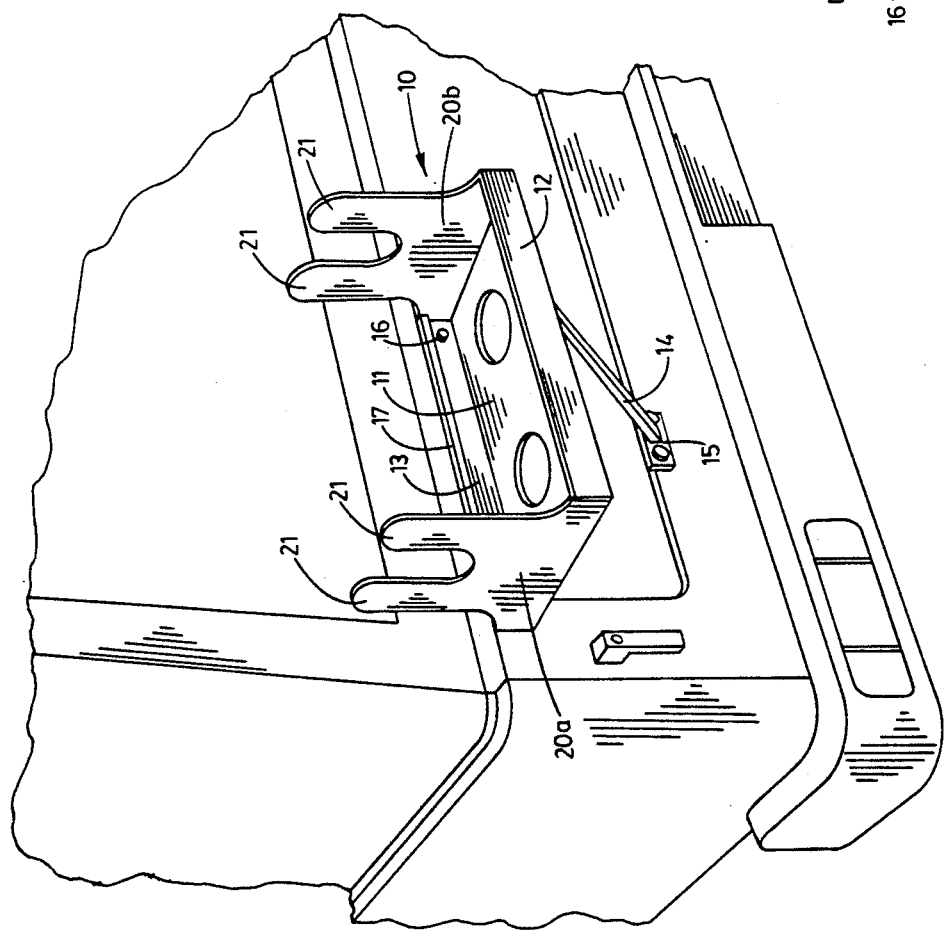
FIG. 1 is an environmental view of the present invention mounted in place at the rear of a vehicle.

Referring to the drawings wherein like reference characters designate like or corresponding parts throughout the several views, and referring particularly to FIG. 1, it is seen that the invention includes a base tray 11 having a front lip 12 and a rear lip 13 attached thereto. A brace 14 is attached to the bottom of the base tray 11, and extends downwardly from the outer edge of tray 11 (near lip 12) at an adjustable angle of between approximately 30 and 60 degrees to a pair of bolts or other mounting means 15. Bolts 15 are attached to the external surface of the vehicle or vessel 10 to which the invention is mounted. Similarly, rear lip 13 is also attached to such vehicle or vessel by bolts or other mounting means 16. Lip 13 is equipped with a horizontal bar 17 to prevent cooler 30 from rubbing against the external surface of the vehicle or vessel 10.

A pair of specially formed side panels 20a and 20b are attached at opposite ends of tray 11 between lips 12 and 13. A pair of upwardly extending prongs 21 are provided in panel 20a to form a "U" shaped upper opening. An identical set of prongs 21 are also provided in panel 20b to form an identical "U" shaped upper opening. The "U" shaped openings of panels 20a and 20b are designed for use with such coolers 30 as have a box 31 and lid 32 pivotally mounted on either side at (pushbutton) pivot joint 33.

A locking strip 22 is provided in one embodiment of the invention as shown in FIG. 6. After the cooler is installed in the invention, strip 22 is slided over prongs 21 of either panel 20a or 20b (or both). Strip 22 is prevented from slipping up by pins 23 located on each prong 21. Pins 23 are movably held in place by a piece of flexible material 24 on the inside of prongs 21 as shown in FIG. 7.

DESCRIPTION OF THE PREFERRED EMBODIMENTS

In the preferred embodiment, the present invention is made of rigid plastic or metal, although wood or other material may also be used. It is designed to be attached by bolts or other means to a vertical planar surface of a vehicle or vessel, such as the back of a utility truck. The tray 11 is attached directly to such surface, and is supported by bracket 14 which is angularly mounted to the bottom of tray 11 at one end, and to the vehicle or vessel 10 at the other end. A bar 17 is provided to prevent the cooler from rubbing against such surface.

The invention is particularly designed to be used with coolers having large pivotally mounted lids 32 that are attached to the box of the cooler 31 at a pair of central pivot joints 33 on the sides of said box. Two panels 20a and 20b having "U" shaped openings are provided by the invention as defined by prongs 21.

To mount a cooler on the invention, the cooler is placed over prongs 21 so that said prongs slide between the box 31 and the lid 32 of the cooler (see FIG. 4). The cooler should be slided downward over prongs 21 until the pivot joints 33 of the cooler reach the bottom of each "U" (see FIG. 2).

The invention is designed so as not to interfere with the user's ability to open the lid and access the cooler (see FIG. 3), while at the same time keeping the cooler itself securely mounted. The invention may be mounted on any exterior surface of a vehicle or vessel, the most common such placement being on the back of a jeep, truck, or other vehicle.

A locking mechanism is provided in an alternative embodiment as shown in FIG. 6. This embodiment includes a set of pins 23 located on the prongs 21 of the panels 20a/20b. Once the cooler is placed onto the invention, a specially formed removable strip 22 is slided over the pins 23 on the prongs 21 which pins hold the strip in place. The strip thereafter serves to hold the pivot joint 33 of the cooler in place, preventing the cooler from bouncing out of the invention. A locking strip may be provided on only one, or on both of panels 20a and 20b. The locking mechanism is also designed so that it does not interfere with the user's access to the cooler.

It is to be understood that variations and modifications of the present invention may be made without departing from the scope thereof. It is also to be understood that the present invention is not to be limited by the specific embodiments disclosed herein, but only in accordance with the appended claims when read in light of the foregoing specification.

I claim:

1. A device in combination with a cooler of a type having a large pivotally mounted lid attached to a box of the cooler at a pair of central pivot joints on the side of said box said device being mounted to a vertical surface comprising:
    a. a rectangular base tray wherein the parallel front and rear edges are longer than the parallel side edges, said tray having an upwardly extending horizontal lip along the front edge and an upwardly extending horizontal lip along the rear edge thereof,
    b. a means for attaching said tray to said vertical surface, and
    c. a pair of vertical panels attached to the opposite sides of said tray, intermediate said front and rear lips, each such panel defined by a pair of protrusions, such protrusions defining a "U" shaped opening between them and receiving said pivot joints.

2. The invention described in claim 1 wherein said cooler may be securely slided over said panels such that the panels are between the box and lid so that said pivot joints fit down into said "U" shaped openings.

3. The invention described in claim 2 wherein a horizontal bar is provided along the inside of the rear lip to hold the cooler securely away from said vertical surface.

4. The invention described in claim 3 wherein each of said protrusions is rounded at the top.

5. The invention described in claim 1 wherein a locking strip is provided that may be slided over the protrusions of one of the "U" shaped openings so as to close the top of said opening and hold the cooler in place.

6. The invention described in claim 5 wherein a second locking strip is provided that may be slided over the protrusions of the other "U" shaped opening so as to close the top of said opening and further hold the cooler in place.

7. The invention described in claim 6 wherein movable pins are provided in each of said protrusions in order to hold each locking strip in place.

8. A device in combination with a cooler of the type which has a lid pivotally mounted on either side of a box at a pair of (pushbutton) pivots said device being mounted to a vertical surface of a vehicle or vessel comprising:
    a. a rectangular tray having a pair of lips along its two longer sides;
    b. a means for mounting said tray on to said vertical surface;
    c. an angular bracket attached to the bottom of said tray;
    d. a means for attaching one end of said bracket to the bottom of said tray, and a means for attaching the opposite end of said bracket to said vertical surface;
    e. a pair of panels attached to the shorter sides of said tray, each of such panels defined by a pair of upwardly pointing prongs, such prongs defining a "U" shaped opening between them;
    whereby said cooler is secured by said panels such that the panels are between the cooler box and the cooler lid so that said cooler pivots fits snugly into the "U" shaped openings.

9. The invention described in claim 8 wherein a horizontal bar is provided along the inside of the rear lip to hold the cooler securely away from said vertical surface.

10. The invention described in claim 9 wherein each of said prongs is rounded at the top.

11. The invention described in claim 9 wherein a locking strip is provided that may be slided over the prongs of one of the "U" shaped openings so as to close the top of said opening and hold the cooler in place.

12. The invention described in claim 11 wherein a second locking strip is provided that may be slided over the prongs of the other "U" shaped opening so as to close the top of said opening and further hold the cooler in place.

13. The invention described in claim 12 wherein movable pins are provided in each of said prongs in order to hold each locking strip in place.

* * * * *